United States Patent
Kim et al.

(10) Patent No.: US 8,089,914 B2
(45) Date of Patent: Jan. 3, 2012

(54) RELAY AND METHOD OF ALLOCATING BANDWIDTH IN COMMUNICATION SYSTEM

(75) Inventors: Ju-Hee Kim, Daejeon (KR); Shang-Lim Shin, Seoul (KR); Kyung-Soo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 720 days.

(21) Appl. No.: 11/869,360

(22) Filed: Oct. 9, 2007

(65) Prior Publication Data

US 2008/0130550 A1 Jun. 5, 2008

(30) Foreign Application Priority Data

Dec. 1, 2006 (KR) .................. 10-2006-0120579

(51) Int. Cl.
*H04B 7/14* (2006.01)
(52) U.S. Cl. ......... 370/315; 370/329; 370/401; 455/450
(58) Field of Classification Search .................. 370/241, 370/241.1, 243, 315, 246, 328, 329, 395.4, 370/316, 320, 345, 313, 431; 455/450–454
See application file for complete search history.

(56) References Cited

U.S. PATENT DOCUMENTS

| | | | |
|---|---|---|---|
| 6,785,252 B1 * | 8/2004 | Zimmerman et al. | 370/337 |
| 7,346,069 B2 | 3/2008 | Lee et al. | |
| 7,529,193 B2 * | 5/2009 | Zimmerman et al. | 370/252 |
| 2002/0120745 A1 * | 8/2002 | Oishi et al. | 709/226 |
| 2005/0141593 A1 | 6/2005 | Pasanen et al. | |
| 2007/0081483 A1 | 4/2007 | Jang et al. | |
| 2007/0086368 A1 | 4/2007 | Lee et al. | |
| 2007/0153758 A1 * | 7/2007 | Kang et al. | 370/338 |
| 2008/0049718 A1 * | 2/2008 | Chindapol et al. | 370/351 |
| 2008/0117854 A1 * | 5/2008 | Saifullah et al. | 370/315 |
| 2008/0151809 A1 * | 6/2008 | Chindapol et al. | 370/315 |
| 2008/0285499 A1 * | 11/2008 | Zhang et al. | 370/315 |
| 2009/0135729 A1 * | 5/2009 | Saffre | 370/252 |

FOREIGN PATENT DOCUMENTS

| | | |
|---|---|---|
| KR | 1019990034353 | 5/1999 |
| KR | 1020030084243 | 11/2003 |
| KR | 1020040051007 | 6/2004 |
| KR | 1020070035869 | 4/2007 |
| KR | 1020070042224 | 4/2007 |
| WO | 2005/067173 | 7/2005 |

OTHER PUBLICATIONS

Seong Jin Heo et al.; "*A Datagram Delivery Strategy for Reducing Retransmission Overheads During Handover*"; Electronics Academic Society Papers, vol. 36-S, No. 1; Jan. 1999; pp. 20-28.

* cited by examiner

*Primary Examiner* — Gary Mui
(74) *Attorney, Agent, or Firm* — Lowe Hauptman Ham & Berner LLP (57) ABSTRACT

To allocate a bandwidth to a terminal, a base station in a communication system including a relay receives a bandwidth request code from the relay, and determines whether a bandwidth request code that is the same as the received bandwidth request code has been received from the terminal. In addition, when the same bandwidth request code has been received from the terminal, the base station allocates the bandwidth to at least one among the relay and the terminal.

12 Claims, 9 Drawing Sheets

RELAY AND METHOD OF ALLOCATING BANDWIDTH IN COMMUNICATION SYSTEM

CROSS-REFERENCE TO RELATED APPLICATION

This application claims priority to and the benefit of Korean Patent Application No. 10-2006-0120579 filed in the Korean Intellectual Property Office on Dec. 01, 2006, the entire contents of which are incorporated herein by reference.

BACKGROUND OF THE INVENTION (a) Field of the Invention

The present invention relates to a relay and a bandwidth allocation method in a communication system, and more particularly, to an uplink bandwidth allocation method and system using a relay in a communication system. This work was supported by the IT R&D program of MIC/IITA[2006-S-011-01, Development of relay/mesh communication system for multi-hop WiBro].

(b) Description of the Related Art

In a communication system, a relay amplifies data of a terminal or relays the data to improve cell coverage of the system. When a terminal in an area of the relay requests a bandwidth and the relay amplifies a bandwidth request message of the terminal to transmit it to a base station, the base station cannot determine whether the terminal has transmitted the bandwidth request message through the relay or has transmitted it directly to the base station. Accordingly, the base station cannot determine whether to transmit the data through the relay.

In another method, the relay generates a message for a bandwidth request code and transmits the massage to the base station. The base station allocates an uplink bandwidth to the terminal according to the message transmitted from the relay, and allocates the uplink bandwidth to the terminal according to the bandwidth request code. Thereby, there is a problem in that the uplink bandwidth is doubled when it is allocated to the terminal, or a frame delay may be generated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for efficiently allocating a bandwidth to a terminal in a communication system including a relay.

In an exemplary method for allocating a bandwidth to a terminal from a base station in a communication system comprising a relay, a bandwidth request code is received from the relay, it is determined whether a bandwidth request code that is the same as the received bandwidth request code has been received from the terminal, and a bandwidth is allocated to at least one among the relay and the terminal when the same bandwidth request code has been received.

In an exemplary method for relaying a bandwidth allocation request received from a terminal to a base station by a relay of a communication system, a first bandwidth request code transmitted from the terminal is copied to generate a second bandwidth request code, and the second bandwidth request code is transmitted to the base station by using a region different from a region to which the first bandwidth request code is allocated, in a frame in which the first bandwidth request code is included.

An exemplary relay includes a means for copying a first bandwidth request code included in a first region of an uplink frame received from a terminal and generating a second bandwidth request code, and a means for allocating the second bandwidth request code to a second region of the uplink frame.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, each block will be understood to indicate a unit for processing at least one function or operation, which may be realized by hardware, software, or a combination thereof.

A method for allocating a bandwidth to a terminal by a base station in a communication system according to an exemplary embodiment of the present invention will be described with reference to the figures. The bandwidth allocation method according to the exemplary embodiment of the present invention may be used in various communication systems, but for convenience of description, an institute electrical and electronics engineers (IEEE) 802.16-based communication system will be exemplified as the communication system.

Firstly, the base station and the terminal in the communication system according to the exemplary embodiment of the present invention will be described with reference to FIG. 1 and FIG. 2.

Figure 1:
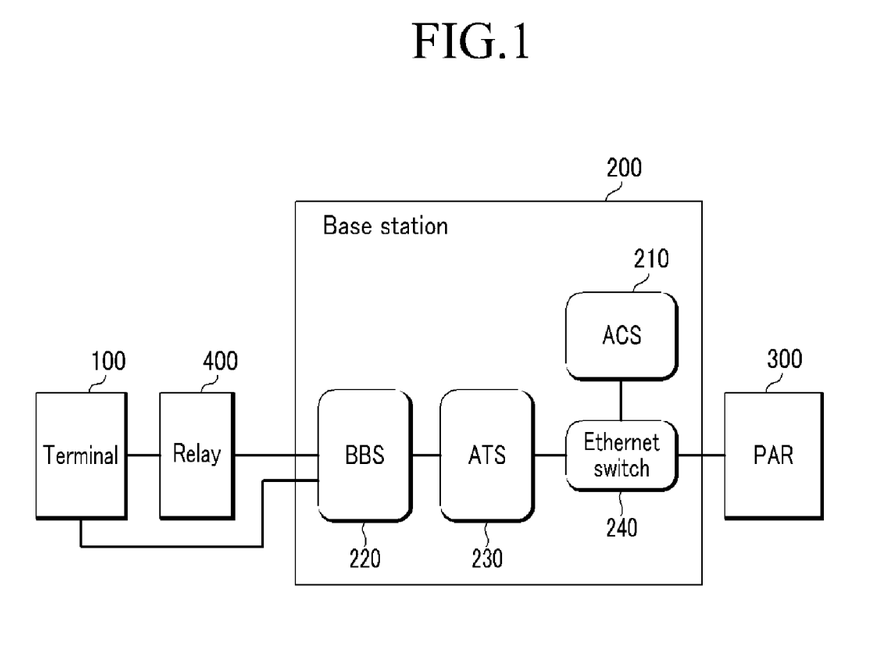
FIG. 1 is a block diagram of a communication system according to an exemplary embodiment of the present invention.
Figure 2:
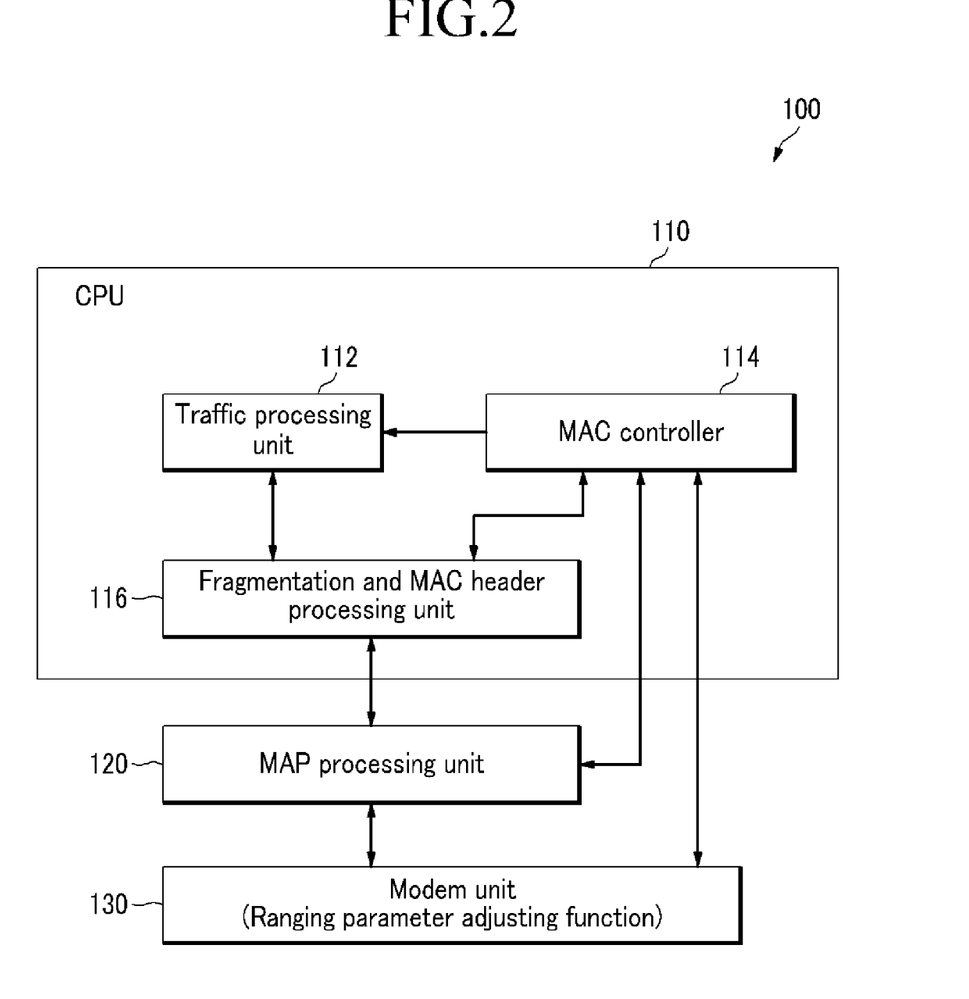
FIG. 2 is a block diagram of a terminal in the communication system shown in FIG. 1.

FIG. 1 is a block diagram of the communication system according to the exemplary embodiment of the present invention, and FIG. 2 is a block diagram of the terminal in the communication system shown in FIG. 1.

As shown in FIG. 1, the communication system includes a terminal 100, a base station 200, a packet access router (PAR) 300, and a relay 400.

The terminal 100 wirelessly accesses the base station 200 and has mobility.

The base station 200 includes an access control subsystem (ACS) 210, a baseband subsystem (BBS) 220, an access traffic subsystem (ATS) 230, and an Ethernet switch 240. The ACS 210 performs a user management and a cell management, and the BBS 220 performs wireless link transmitting/receiving functions. The ATS 230 performs traffic process and wireless link transmitting/receiving control functions, and the Ethernet switch 240 performs an access control function between the ACS 210, the ATS 230, and the PAR 300.

The PAR 300 performs a packet access routing function and an external agent function of a mobile Internet protocol (IP). The relay 400 relays or amplifies a signal transmitted from the terminal 100 to transmit it to the base station 200, and manages the terminal 100 in relay coverage.

As shown in FIG. 2, the terminal 100 includes a central processing unit (CPU) 110, a MAP processing unit 120, and a modem unit 130.

The CPU 110 includes a traffic processing unit 112, a medium access control (MAC) controller 114, and a fragmentation and MAC header processing unit 116. The MAC controller 114 obtains a code division multiple access (CDMA) code and a back-off parameter for a ranging operation through user data document (UDD) broadcasted to the base station 200. In addition, the MAC controller 114 receives information on resources allocated to perform the ranging operation from the MAP processing unit 120 for processing an uplink (UL) MAP. Based on the information, the MAC controller 114 transmits the CDMA code and resource information for transmitting the CDMA code to the modem unit 130 so as to transmit the CDMA code directly to the base station 200 or transmit the CDMA code to the base station 200 through the relay 400.

The terminal 100 receives a response message (a CDMA allocation IE) for the CDMA code from the base station 200 within a predetermined time. When the code received from the base station 200 is matched to the transmitted code, the terminal 100 may transmit a bandwidth request header to the base station 200 directly or through the relay 400. When the response message for the bandwidth request code transmitted to the base station from the terminal exceeds a predetermined response time, the bandwidth request code is transmitted again to the base station after a back-off operation is performed. The base station 200 analyzes the received bandwidth request header and allocates an uplink band.

The bandwidth allocation method according to the exemplary embodiment of the present invention will now be described with reference to FIG. 3, FIG. 4, FIG. 5A to FIG. 5E, and FIG. 6.

Figure 3:
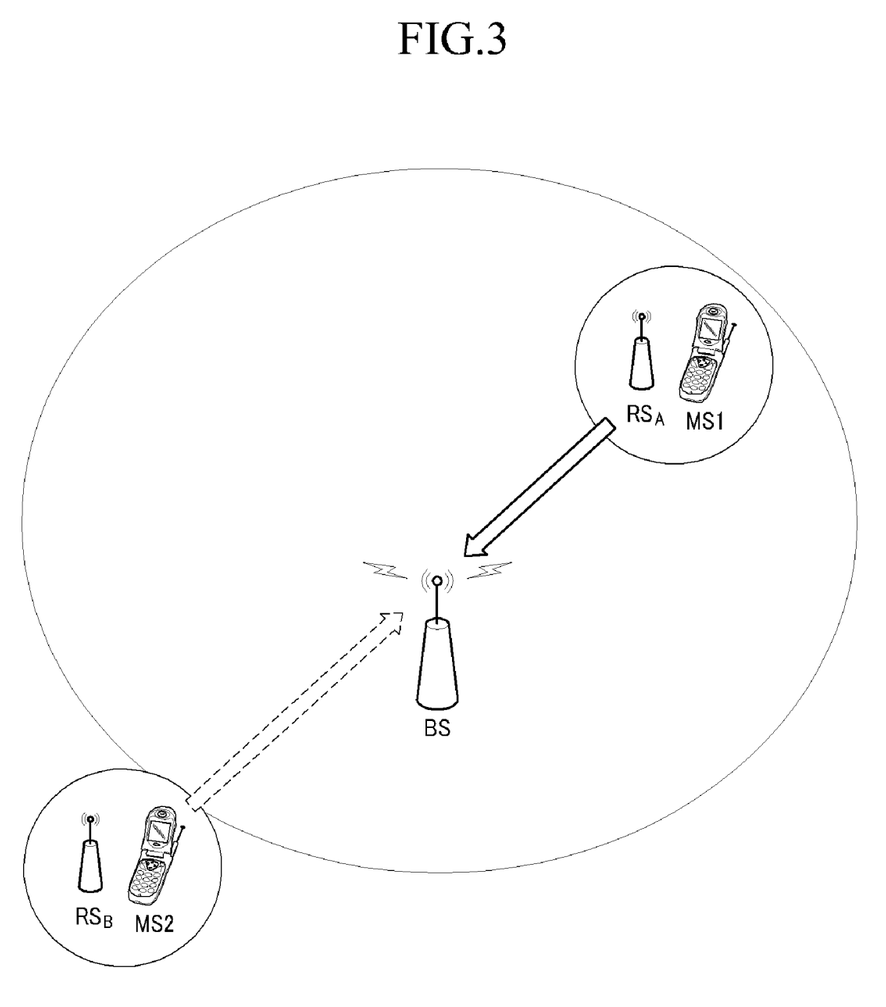
FIG. 3 is a block diagram representing one cell in the communication system according to the exemplary embodiment of the present invention.
Figure 4:
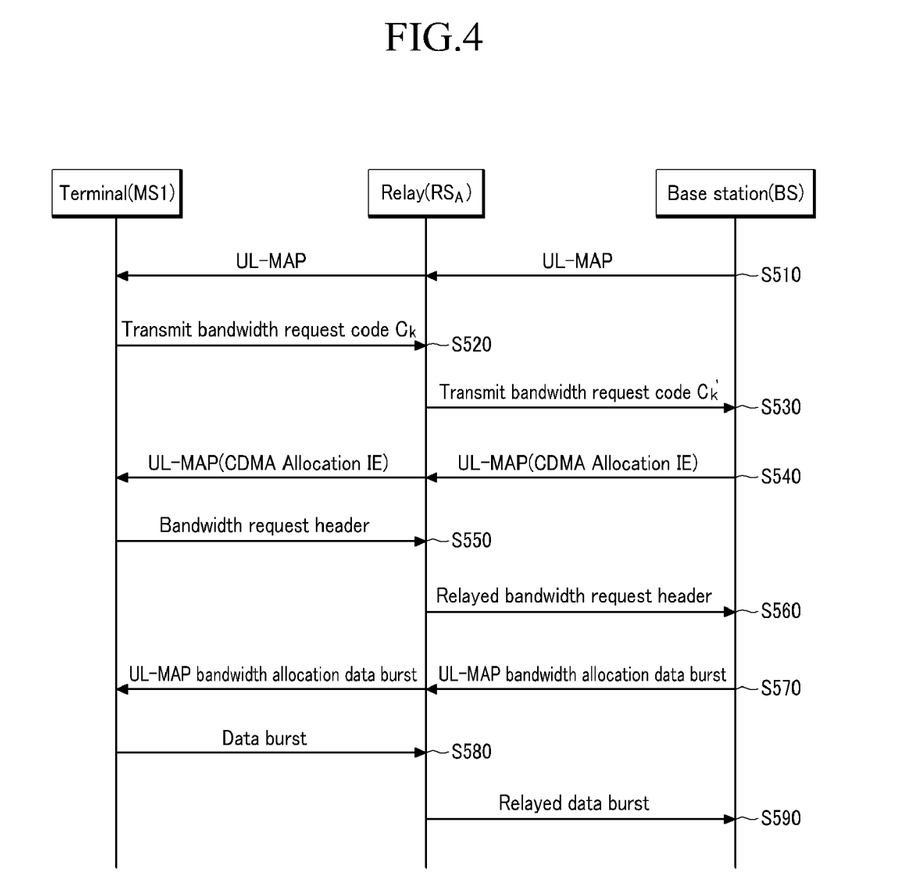
FIG. 4 is a diagram of an uplink bandwidth allocation method according to the exemplary embodiment of the present invention.
Figure 5A:
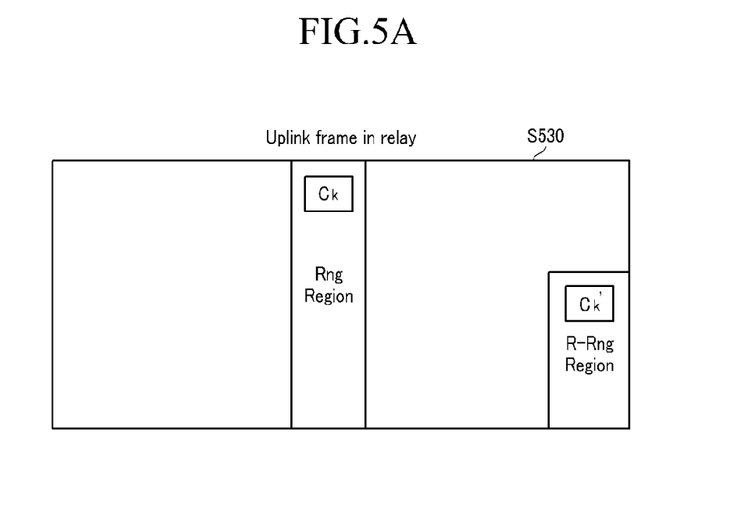
FIG. 5A to FIG. 5E respectively show diagrams of uplink frame configurations according to the exemplary embodiment of the present invention.
Figure 5B:
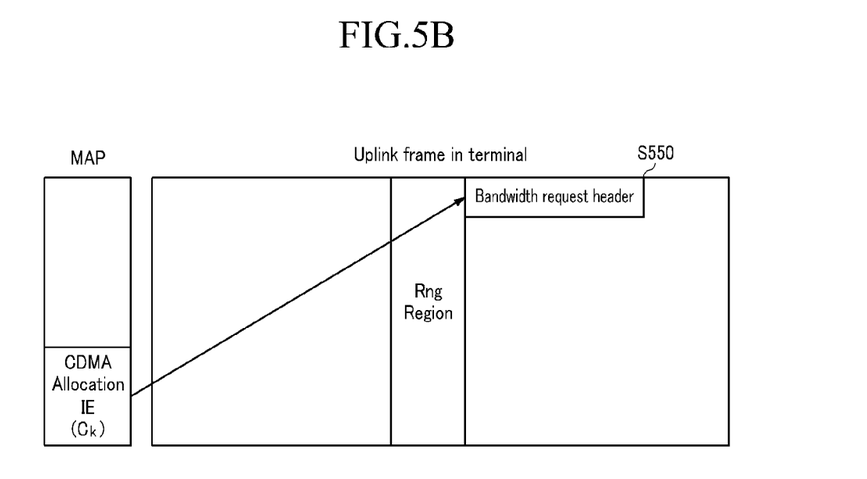
Figure 5C:
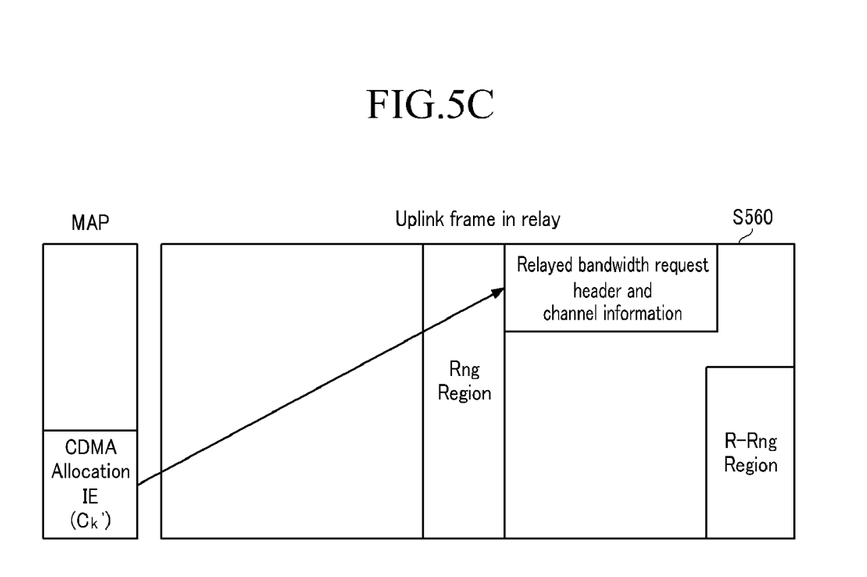
Figure 5D:
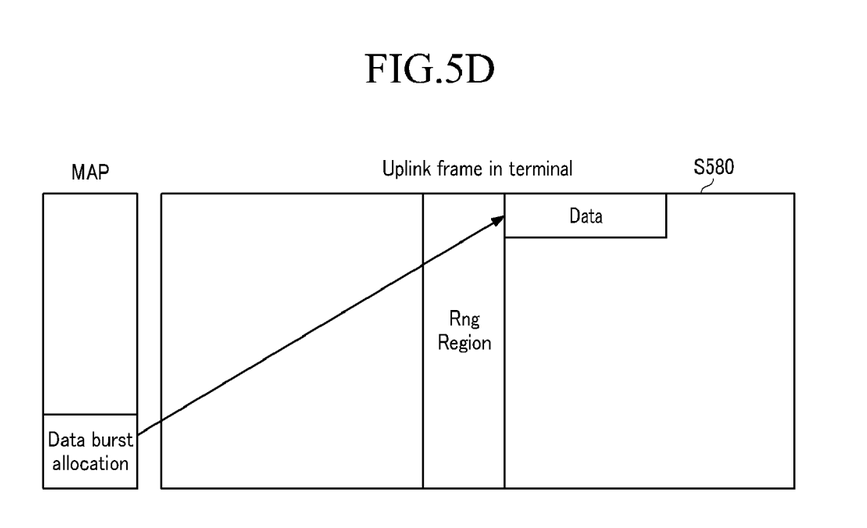
Figure 5E:
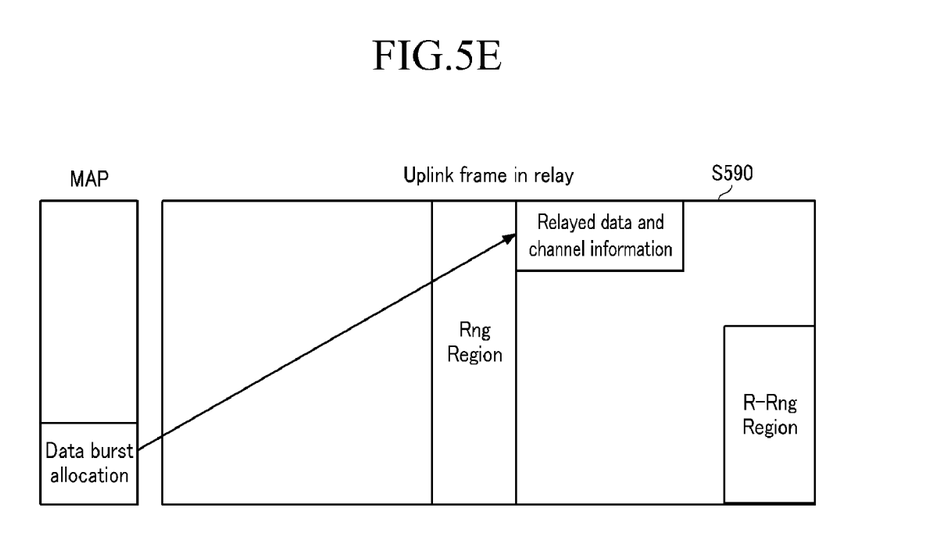
Figure 6:
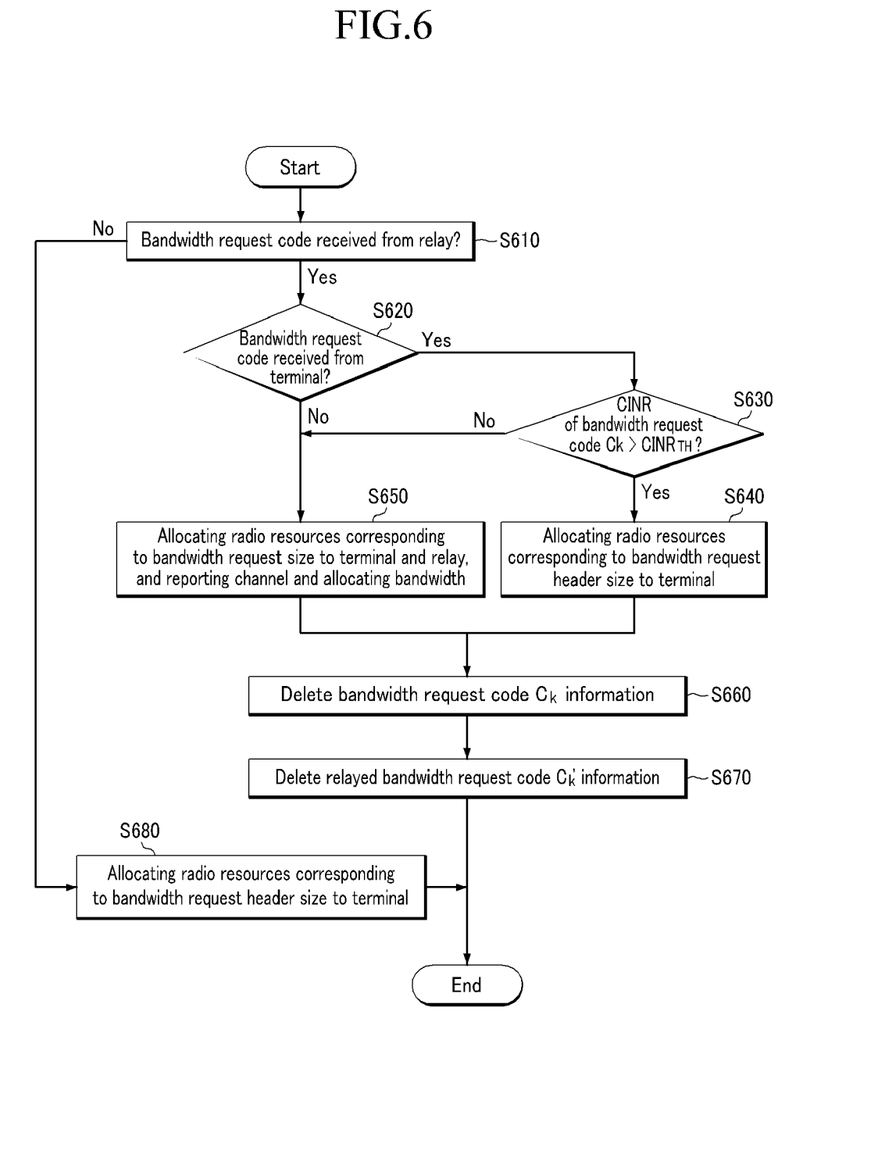
FIG. 6 is a diagram representing a process of a bandwidth request code in a base station according to the exemplary embodiment of the present invention.

FIG. 3 is a block diagram representing one cell in the communication system according to the exemplary embodiment of the present invention, and FIG. 4 is a diagram of an uplink bandwidth allocation method according to the exemplary embodiment of the present invention. FIG. 5A to FIG. 5E respectively show diagrams of uplink frame configurations according to the exemplary embodiment of the present invention. FIG. 6 is a diagram representing a process of a bandwidth request code in the base station according to the exemplary embodiment of the present invention.

As shown in FIG. 3, terminals MS1 and MS2 positioned within the coverage of relays $RS_A$ and $RS_B$ may request the bandwidth from the base station BS through the relays $RS_A$ and $RS_B$, or they may directly request the bandwidth from the base station BS.

When receiving the bandwidth request code $C_k$ from the terminal MS1 and MS2, the relays $RS_A$ and $RS_B$ copy the received bandwidth request code $C_k$, and differentiate a region to transmit the copied code $C_k'$ to the base station in the same frame. The base station BS identifies whether the received bandwidth request code is a signal through the relays $RS_A$ and $RS_B$ or the signal directly from the terminals MS1 and MS2, compares the bandwidth request codes from the relays $RS_A$ and $RS_B$ and the terminals MS1 and MS2, and allocates an uplink bandwidth to the terminals MS1 and MS2 and/or relays $RS_A$ and $RS_B$.

A method for allocating the uplink bandwidth to the terminal MS1 through the relay $RS_A$ by the base station BS will now be described with reference to FIG. 4, FIG. 5A to FIG. 5E, and FIG. 6.

As shown in FIG. 4, the base station BS transmits the UL-MAP to the terminal MS1 in step S510. The terminal MS1 receiving the UL-MAP provides the bandwidth request code $C_k$ to a ranging region to transmit it to the base station BS as shown in FIG. 5A in step S520. In this case, as shown in FIG. 5A, the relay $RS_A$ copies the bandwidth request code $C_k$ transmitted from the terminal MS1, and provides the copied bandwidth request code $C_k'$ to another region in the same frame (i.e., a relay ranging (R-Rng) region) to transmit it to the base station in step S530. The R-Rng region is used to relay a ranging code.

As shown in FIG. 6, after the base station BS receives the bandwidth request code $C_k'$ from the relay $RS_A$ in step S610, the base station BS searches the bandwidth request code to determine whether the same bandwidth request code $C_k$ is received from the terminal MS1 in step S620. When receiving the same bandwidth request code from the terminal MS1, the base station BS compares a carrier to interference noise ratio (CINR) of the bandwidth request code $C_k$ received from the terminal and a threshold $CINR_{TH}$ in step S630. When the CINR of the bandwidth request code $C_k$ received from the terminal is greater than the threshold $CINR_{TH}$, the base station BS determines that the signal is not required to pass through the relay, and allocates radio resources for transmitting a bandwidth request header to the terminal MS1 in step S640.

When the bandwidth request code $C_k$ is not received from the terminal MS1 or the CINR of the bandwidth request code $C_k$ received from the terminal is less than the threshold $CINR_{TH}$, the base station BS determines to transmit data through the relay $RS_A$. Accordingly, the base station BS respectively allocates the radio resources for transmitting the bandwidth request header to the terminal MS1 and the relay $RS_A$ in step S650. In this case, the base station BS may allocate one bite more to the relay $RS_A$ for channel information of the terminal MS1 in step S650. Here, the channel information is provided to perform a power control of the terminal MS1 using an adaptive modulation and coding (AMC) method, and detect states of the terminal MS1 (e.g., power, timing, a frequency offset, and so on) in the coverage of the relay $RS_A$.

Subsequently, the base station BS deletes information of the bandwidth request code $C_k$ from the terminal and the bandwidth request code $C_k'$ from the relay in steps S660 and S670, and prepares to receive the bandwidth request code. If the base station BS does not receive the bandwidth request code $C_k'$ from the relay $RS_A$, the base station BS allocates the radio resources for transmitting the bandwidth request header to the terminal in step S680 in response to the bandwidth request code $C_k$ transmitted from the terminal MS1.

That is, the base station BS determines whether the bandwidth request code $C_k$ is transmitted to the terminal MS1 through the relay $RS_A$ or it is directly transmitted to the terminal MS1. Subsequently, as shown in FIG. 4, the base station BS directly transmits the UL-MAP including a code division multiple access (CDMA) allocation IE to the terminal MS1 or transmits the UL-MAP to the terminal MS1 through the relay $RS_A$ in response to the bandwidth request code $C_k$ in step S540. Here, the radio resources allocated to the UL-MAP transmitted from the base station BS to the terminal MS1 is marked to allocate the radio resources for transmitting the bandwidth request header to the terminal MS1. The terminal MS1 receiving the UL-MAP including the CDMA allocation IE provides the bandwidth request header to the radio resources allocated through the UL-MAP to transmit it to the base station BS through the relay $RS_A$, and allocates the bandwidth in steps S550 and S560. In addition, as shown in FIG. 5B, the terminal MS1 uses the radio resources allocated through the UL-MAP to provide the bandwidth request header to the uplink frame and transmit it to the relay in step S550. Further, as shown in FIG. 5C, the relay $RS_A$ receiving the bandwidth request header from the terminal generates channel information and terminal state information from the bandwidth request header, and provides the information to the uplink frame to transmit it to the base station in step S560. By using the channel information and the terminal state information, the base station may perform power control operations for the terminals within the coverage of the base station and outside the coverage of the base station. Since appropriate power is maintained in a forward channel from the base station to the terminal and in a backward channel transmitted from the terminal to the base station by performing the power control operation, a packet loss of packet transmission may be reduced, communication quality may be maintained, and terminal capacity within the coverage of the base station may be maximized.

Subsequently, as shown in FIG. 4, the base station BS receiving the bandwidth request header transmits a bandwidth allocation data burst receiving the bandwidth for the uplink data transmission through the UL-MAP directly to the terminal MS1 or to the terminal MS1 through the relay in step S570. Subsequently, the terminal MS1 uses the bandwidth allocated in the UL-MAP to transmit the data directly to the base station BS or to the base station BS through the relay $RS_A$ in steps S580 and S590. Here, as shown in FIG. 5D, the terminal provides the actual data to the uplink frame to transmit the data to the relay in step S580. In addition, as shown in FIG. 5E, the relay receives the data generated by the channel information and state information of the terminal, and provides it to the uplink frame to transmit it to the base station in step S590.

Further, according to the exemplary embodiment of the present invention, a region to which the bandwidth request code $C_k'$ shown in FIG. 5 copied by the relay is provided may be allocated to a latest part of the uplink frame. Accordingly, compatibility with the terminal according to the IEEE 802.16e standard may be maintained. That is, there is no problem in the system access even when the terminal does not know the resources allocated to the bandwidth request code region.

Figure 7:
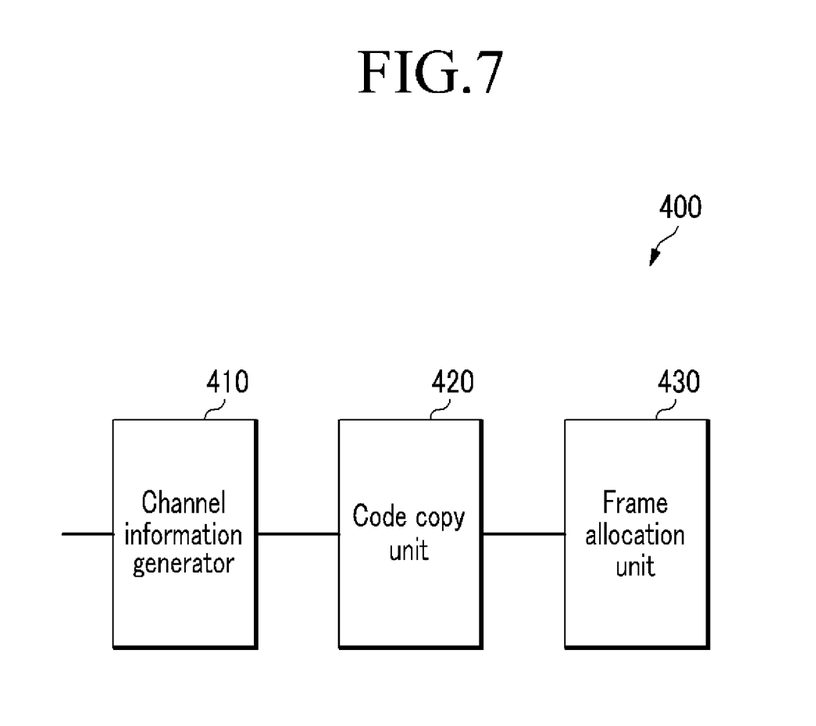
FIG. 7 is a block diagram of a relay according to the exemplary embodiment of the present invention.

To perform the above operations, as shown in FIG. 7, the relay 400 according to the exemplary embodiment of the present invention includes a channel information generator 410, a code copy unit 420, and a frame allocation unit 430. The channel information generator 410 generates the channel information and state information of the terminal, the code copy unit 410 copies the bandwidth request code $C_k$ shown in FIG. 5A from the terminal to generate the bandwidth request code $C_k'$ shown in FIG. 5A, and the frame allocation unit 420 allocates the copied bandwidth request code $C_k'$ to another region R-Rng Region shown in FIG. 5A in the same frame.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiment of the present invention, since the communication system allocates the bandwidth by using the relay, the communication system may transmit/receive the data with the terminal outside the coverage of the base station or the terminal within the coverage of the relay. In addition, the coverage of the communication system may be increased, and throughput may be improved. Further, when the bandwidth request code is transmitted from the terminal of the communication system to the base station through the relay, an efficient power control operation for the terminal outside the coverage of the base station is performed, and therefore system performance may be increased.

What is claimed is:

1. A method for allocating a bandwidth to a terminal from a base station in a communication system comprising a relay, the method comprising:
   receiving a bandwidth request code from the relay; and
   allocating a bandwidth to at least one of the relay and the terminal when the same bandwidth request code has been received from the terminal, wherein the allocating of the bandwidth comprises:
   determining whether to allocate a resource for a bandwidth request header to the terminal through the relay;
   when the resource for the bandwidth request header are allocated to the terminal through the relay, allocating a first resource to the terminal, and allocating a second resource to the relay; and
   transmitting information on the allocated resources.

2. The method of claim 1, wherein the allocating of the second resource further comprises allocating a third resource for transmitting channel and state information of the terminal to the relay.

3. The method of claim 1, wherein the determining whether to allocate the resource for the bandwidth request header comprises comparing a carrier to interference noise ratio (CINR) of the bandwidth request code received from the terminal and a threshold.

4. The method of claim 3, wherein the first resource is allocated to the terminal when the CINR is greater than the threshold, and the first resource is allocated to the terminal and the second resource is allocated to the relay when the CINR is less than the threshold.

5. The method of claim 1, wherein the first and second resources respectively correspond to a size of the bandwidth request header.

6. The method of claim 1, wherein the allocating of the bandwidth comprises:
   receiving the bandwidth request header from the relay; and
   transmitting a bandwidth allocation data burst for uplink bandwidth allocation corresponding to the received bandwidth request header to the relay.

7. The method of claim 1, wherein the allocated resource information is included in a code division multiple access (CDMA) allocation information element (IE) of an uplink (UL)-MAP.

8. A method for relaying a bandwidth allocation request received from a terminal to a base station by a relay of a communication system, the method comprising:
 copying a received bandwidth request code transmitted from the terminal;
 using a region of an uplink frame different from a region allocated to the received bandwidth request code, transmitting the copied bandwidth request code to the base station in the same uplink frame as the received bandwidth request code;
 receiving a response message from the base station; and
 relaying the response message to the terminal,
 wherein the response message comprises information on a first resource for a bandwidth request header of the terminal and information on a second resource for the bandwidth request header of the relay.

9. The method of claim 8, further comprising:
 receiving the bandwidth request header from the terminal;
 receiving a bandwidth allocation data burst from the base station;
 transmitting the bandwidth allocation data burst to the terminal;
 receiving uplink data from the terminal; and
 transmitting the uplink data to the base station.

10. The method of claim 9, further comprising:
 generating channel information of the terminal from the bandwidth request header; and
 transmitting the channel information to the base station.

11. The method of claim 10, wherein the response message comprises information on a third resource for the channel information of the terminal.

12. The method of claim 8, wherein the copied bandwidth request code is provided to a latest part of the frame.

* * * * *